May 30, 1950 J. K. ROSE 2,509,841

ALBUM FOR PHONOGRAPH RECORDS

Filed March 20, 1946 3 Sheets-Sheet 1

Inventor:-
Joseph K. Rose,

By Pierce & Scheffler,
Attorneys.

May 30, 1950 J. K. ROSE 2,509,841

ALBUM FOR PHONOGRAPH RECORDS

Filed March 20, 1946 3 Sheets-Sheet 2

Inventor:
Joseph K. Rose,

By Pierce & Scheffler,
Attorneys.

May 30, 1950 J. K. ROSE 2,509,841
ALBUM FOR PHONOGRAPH RECORDS
Filed March 20, 1946 3 Sheets-Sheet 3
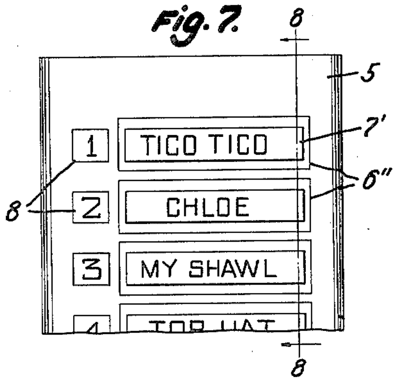
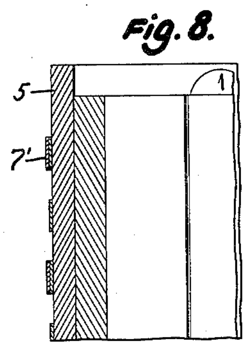
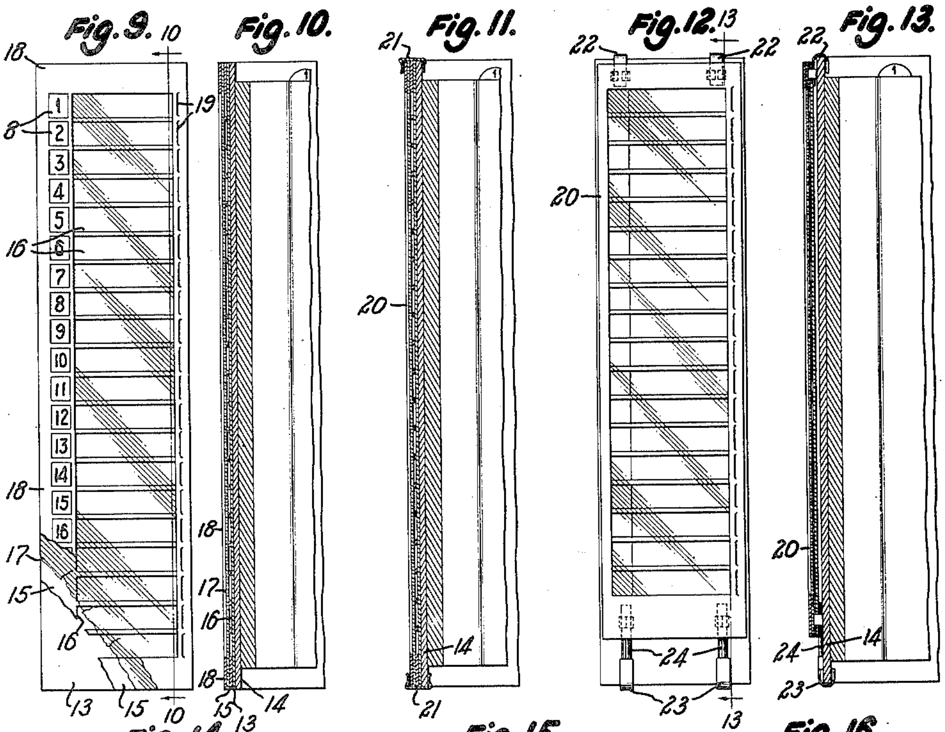
Fig. 9. Fig. 10. Fig. 11. Fig. 12. Fig. 13.
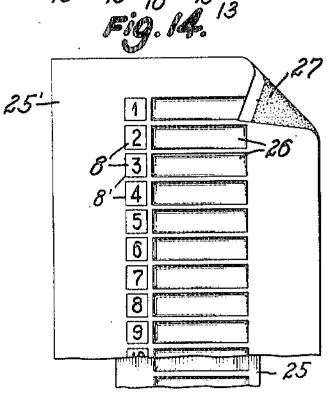
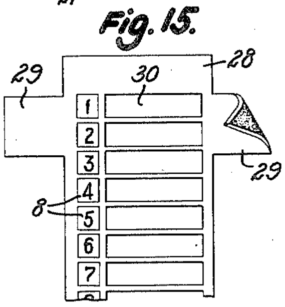
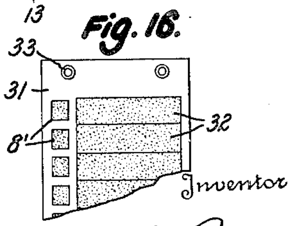
Inventor:-
Joseph K. Rose,
By
Pierce & Scheffler,
Attorneys.

Patented May 30, 1950

2,509,841

UNITED STATES PATENT OFFICE 2,509,841

ALBUM FOR PHONOGRAPH RECORDS

Joseph K. Rose, Chicago, Ill.

Application March 20, 1946, Serial No. 655,668

1 Claim. (Cl. 283—40)

This invention relates to albums for phonograph records and more particularly to novel indexing systems for facilitating the identification of the records which are stored in the album.

The conventional phonograph record album is of book form with pockets for receiving about ten to twenty records, and with a printed form on the inside of the front cover for listing the titles of the several phonograph records which are placed in the pockets. These albums and their index systems for listing the records are far from satisfactory for a number of reasons. The indexes are not visible from the front of the record cabinet and the selection of a particular record frequently involves the removal of a number of albums from the cabinet before the album which contains the desired record is located. Furthermore, no provision is made for a change in the indexing when some or all of the phonograph records are discarded and replaced by new records.

Objects of the invention are to provide phonograph record albums with indexing systems on the backs of the albums, whereby the titles or names of all of the records in a more or less extensive collection are continuously in view when the albums are arranged in conventional manner in an album compartment or cabinet. Other objects of the invention are to provide indexing systems, and phonograph record albums having indexing systems, which may be readily altered when one or more new records are substituted for those previously stored in the album. Objects are to provide indexing systems for record albums, and record albums including indexing systems, which are characterized by separate pockets or spaces for the reception of index tabs or title slips for the individual records. Other objects are to provide indexing strips for attachment to record albums, the strips being of preselected lengths for use on albums of different sizes and record capacities or being of relatively great length to be cut into separate indexing strips of a desired length or lengths.

These and other objects and the advantages of the invention will be apparent from the following description when taken with the accompanying drawings in which:

Fig. 7 is a fragmentary elevation of the back of another album embodying the invention;

Fig. 8 is a fragmentary section on the plane indicated by the section line 8—8 of Fig. 7;

Fig. 9 is an elevation, with parts broken away, of a separately formed indexing strip which may be attached to the back of an album;

Fig. 10 is a fragmentary vertical section through the back of an album with the indexing strip glued thereto, the section being substantially on the plane indicated by line 10—10 of Fig. 9;

Fig. 11 is a similar fragmentary section showing the indexing strip secured to the back of an album by spring clips;

Fig. 12 is an elevation of the back of an album with an indexing strip attached thereto by tension members and clips;

Fig. 13 is a fragmentary vertical section of the same on the plane indicated by line 13—13 of Fig. 12;

Figs. 14 and 15 are fragmentary elevations of indexing strips of somewhat different types which have gummed extensions for securing the same to record albums; and Fig. 16 is a fragmentary elevation of an indexing strip of a white plastic having slightly roughened index spaces on which the record titles may be readily written in or erased.

Figure 1:
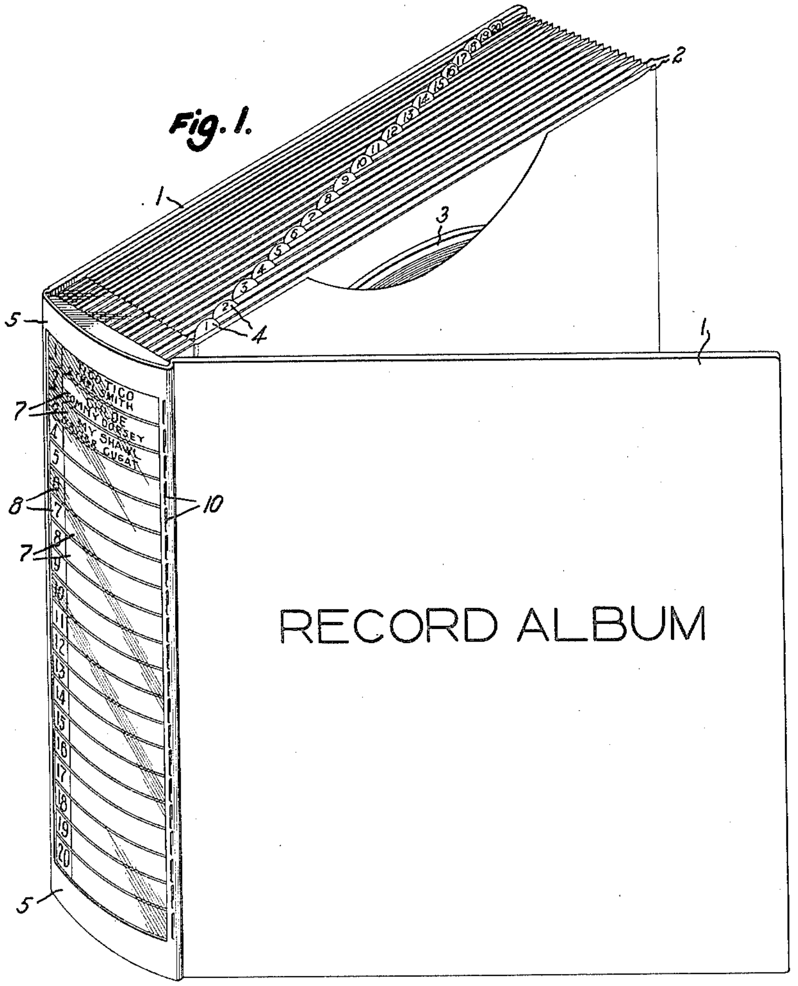
Fig. 1 is a perspective view of a phonograph record album embodying the invention.

In the drawings, the reference numeral 1 identifies the front cover of an album having a number of pockets 2 for receiving phonograph records 3, the pockets having serially numbered tabs 4. According to the invention, the indexing system is arranged on the back 5 and comprises a plurality of recesses 6 for receiving title slips or index tabs 7 individual to the several records in the numbered pockets 2. The index recesses have identifying numbers 8 corresponding to the numbering of the pocket tabs 4, there being twenty record pockets and index recesses in the illustrated album. A transparent strip of Celluloid or other plastic is arranged over the index tab recesses, and slots 10 in the rounded edge of the album back 5 afford access to the recesses 6 for the insertion and removal of the index tabs 7.

Figure 4:
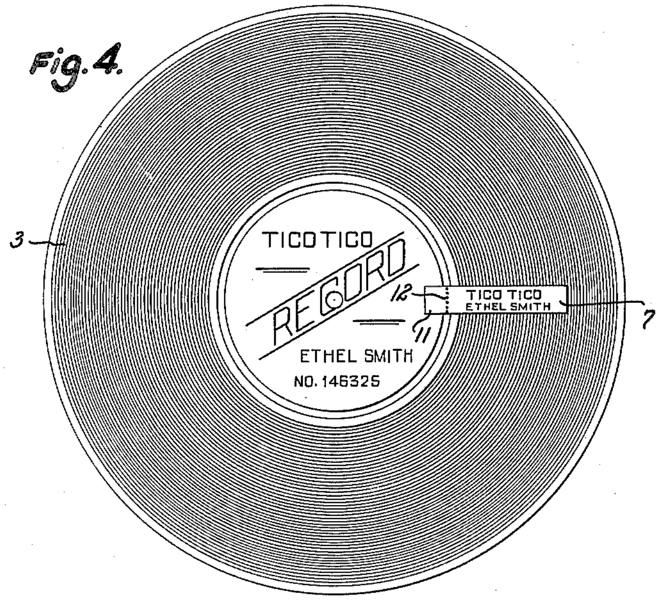
Fig. 4 is an elevation of a phonograph record carrying an index tab for use in the album.

The index tabs 7 may be prepared by the album owner or by the dealer or distributor but, preferably, these tabs 7 are prepared by the recording studio and affixed to the paper envelopes in which the records are purchased or, as shown in Fig. 4, the index tabs may be affixed directly to the records 3 by small gummed extensions 11. The printed strip is weakened, for example by a row of perforations 12, to facilitate the removal of the index tab 7 from the record. The individual index tabs 7 may be of different colors, in whole or in part, to indicate the general type of the recording as instrumental, operatic or the like.

The index tabs 7 from the records are placed in the appropriate recesses 6 of the indexing system when a new album is placed in use, or the index tabs 7 are prepared by the owner of the album if they are not furnished with the records. As records are discarded to make room for newer records, the old index tabs are removed and replaced by new index tabs. The index system is thus readily kept up to date, and the desired records are readily located by inspection and without opening the albums as the indexing systems are on the backs of the albums.

Figure 5:
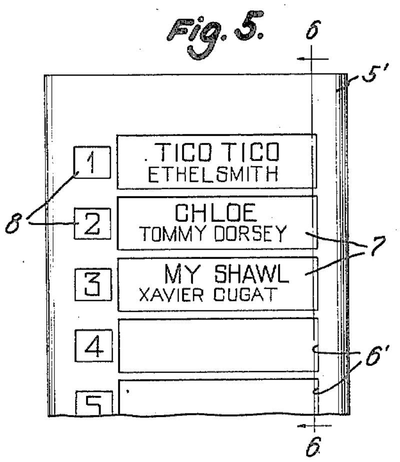
Fig. 5 is a fragmentary elevation of the back of an album having a modified form of recess for receiving the index tabs.
Figure 6:
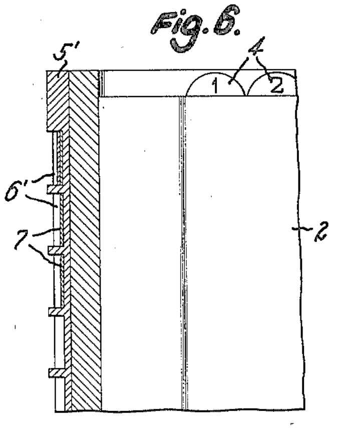
Fig. 6 is a fragmentary vertical section of the album as seen on the plane of line 6—6 of Fig. 5.

As shown in Figs. 5 and 6, a series of recesses 6′ may be molded or pressed directly in the back 5′ of an album, the recesses 6′ being of substantially the same size as the index tabs 7, whereby the latter are securely retained by friction when pressed into place. The index tabs may be removed with a needle or pin when the records are changed and a new index tab is to be inserted, or a new index tab 7 may be inserted over the old one, as shown in the topmost recess 6′ of Fig. 6.

A further modification, as shown in Figs. 7 and 8, comprises an indexing system on the album back 5 which comprises a series of identifying numbers 8 arranged in line with a series of spaces which are marked off by lines 6″ to receive gummed title strips or indexing tabs 7′. New gummed strips 7′ may be affixed over the old strips when the records are changed and, when the accumulation of gummed strips at an index space becomes too thick, the index tabs may be trimmed off with a knife. As an alternative to the use of gummed title strips 7′, the back of the album may be of a light color or white plastic as described hereinafter with respect to Fig. 16, with slightly roughened surfaces within the space-defining lines 6″, upon which the titles may be written in and, when desired, erased for new entries.

The invention also contemplates the manufacture of the indexing strips as separate elements of fixed length, or of extended length for later subdivision into sections of desired length or lengths, which may be affixed to any phonograph record albums.

Figure 2:
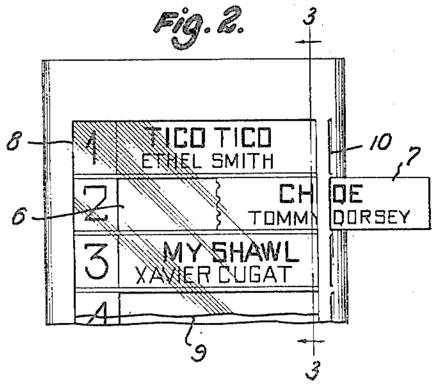
Fig. 2 is a fragmentary elevation of the back of the album.
Figure 3:
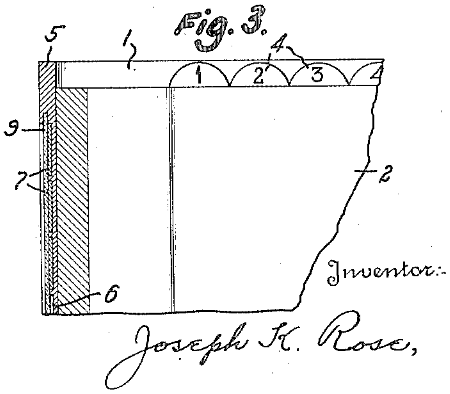
Fig. 3 is a fragmentary vertical section of the album as seen on the plane of line 3—3 of Fig. 2.

As shown in Figs. 9 and 10, the index strips comprise a series of superposed sheets or laminations which are cemented or glued to each other to form an indexing system similar to that illustrated in Figs. 1 to 3. The back sheet 13 may be gummed to facilitate its attachment to the back 14 of an album, and the next adjacent sheet 15 has a series of openings therethrough which form the pockets 16 for receiving the index tabs or title slips. A transparent sheet 17 overlies the sheet 15, and the outer sheet 18 is opaque with an elongated opening through which the several pockets 16 and index tabs therein are exposed to view. The outer sheet 18 has a series of slots 19 in line with the several pockets to permit the insertion and removal of the index tabs.

As shown in Fig. 11, an index strip assembly 20 may be detachably secured to the album back 14 by upper and lower spring clips 21 which are of approximately U-shape in cross-section. Alternatively, an index strip assembly 20 may be detachably secured to the album back 14 by upper clips 22 which are rigidly fixed to the assembly, and lower clips 23 which are connected to the assembly 20 by elastic or spring strips 24. The index strip assemblies 20 of Figs. 11 to 13 may be of the construction which is shown in detail in Fig. 9 or they may be otherwise formed, as described hereinafter, to provide individual spaces for the identification of the several records stored in the album.

As illustrated in Fig. 14, the indexing strip 25 may be of relatively heavy cardboard with molded or embossed recesses 26 for receiving index tabs 7 which are furnished with the records or prepared by the owner of the album. A series of numbers 8 corresponding to the numbering of the album pockets may be printed within spaces 8′ in line with the recesses 26 or, alternatively, the spaces 8′ may be recessed to receive separate number tabs when a single series of numbers is to be used on a plurality of albums. The embossed index strip 25 may be attached to the album by clips as shown in Figs. 11 to 13 or, as illustrated, a relatively wide cover sheet 25′ may be glued to or originally formed as a part of the cardboard, the edges of the sheet 25′ having a coating of glue 27 for attaching the index strip to an album.

It is not essential that the gummed edges extend the full length of the indexing assembly since, as shown in Fig. 15, an index strip 28 may be attached to an album by a plurality of gummed extensions 29. The index strip 28 is a relatively heavy sheet of paper or of cardboard with openings 30 therethrough which form recesses similar to the pockets 6′ of Fig. 6 when the strip is attached to the album back.

As indicated above, the indexing system may be provided by a sheet or strip 31 of a white or light colored plastic having a slightly roughened area 32 on which the titles of the records may be written by the owner, see Fig. 16. Individual entries may be erased and replaced by other entries when records are changed. Numbers identifying the several album pockets may be printed on the strip 31 or, as illustrated, the surface within boundary lines 8′ may be roughened to facilitate the writing in of the identifying numbers. The index strip 31 may be secured to the album back by clips as described above with reference to Figs. 11 or 13 or, as illustrated in Fig. 16, eyelets or rivets 32 may be employed to secure the index strips 31, or the other forms of index strips, to the albums.

The index strips may be made in several lengths for application to albums of different capacities, or they may be made in extended lengths or rolls and cut to size for the particular album upon which they are to be mounted.

All record albums are not provided with identifying numbers or tabs which extend above the several pockets, as shown in Fig. 1. The owner may write in numbers on the pockets but it will be preferable to supply a series of numbered tabs with the indexing systems of Figs. 9 to 16, the tabs being gummed for application to the album pockets and designed to extend above the same to facilitate the selection of the desired record.

The several described embodiments indicate the wide latitude that is permissible in the design and construction of the record albums and indexing systems according to the invention. It will be apparent that other modifications fall within the spirit and scope of the invention as set forth in the following claim. For example, separately formed index strips such as shown in Figs. 9 to 15 may include paper covered with a heavy foil of lead, zinc or alloys which may be bent over the ends of the album back to attach the index strip to the album.

I claim:

A phonograph record album comprising a back embossed to provide a recess with ribs at the bottom thereof forming a series of index receiving spaces, said back having openings along one edge communicating with the respective spaces, a sheet of transparent material within the recess of said back and contacting said ribs, and identifying numbers adjacent the several index receiving spaces.

JOSEPH K. ROSE.

REFERENCES CITED

The following references are of record in the file of this patent:

UNITED STATES PATENTS

| Number | Name | Date |
|---|---|---|
| 1,278,259 | Tremaine | Sept. 10, 1918 |
| 1,754,908 | Schade | Apr. 15, 1930 |
| 1,886,801 | Freiberg | Nov. 8, 1932 |
| 1,940,442 | Batek | Dec. 19, 1933 |

FOREIGN PATENTS

| Number | Country | Date |
|---|---|---|
| 363,876 | Great Britain | Dec. 31, 1931 |